United States Patent
Ogino et al.

(10) Patent No.: US 6,889,051 B2
(45) Date of Patent: May 3, 2005

(54) METHOD AND APPARATUS FOR MEASURING TRANSMITTING TIME OFFSET OF A BASE STATION

(75) Inventors: Atsushi Ogino, Kodaira (JP); Mikio Kuwahara, Hachioji (JP); Tomoaki Ishifuji, Tokyo (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 10/046,509

(22) Filed: Jan. 16, 2002

(65) Prior Publication Data

US 2002/0098839 A1 Jul. 25, 2002

(30) Foreign Application Priority Data

Jan. 19, 2001 (JP) ........................................ 2001-011658

(51) Int. Cl.[7] .................................................. H04Q 7/20
(52) U.S. Cl. ............................... 455/456.1; 455/456.5; 455/456.6; 342/450; 342/463
(58) Field of Search .......................... 455/456.1, 456.6, 455/456.5; 342/450, 458, 463, 465

(56) References Cited

U.S. PATENT DOCUMENTS 4,057,803 A * 11/1977 Coleman .................... 342/446
5,684,794 A * 11/1997 Lopez et al. ................ 370/337
6,268,824 B1 * 7/2001 Zhodzishky et al. ... 342/357.04
6,275,705 B1 * 8/2001 Drane et al. ............. 455/456.2

FOREIGN PATENT DOCUMENTS

| JP | 7-181242 | 12/1993 |
|----|----------|---------|
| WO | WO 99/56413 | 4/1999 |
| WO | WO 00/69198 | 5/2000 |

OTHER PUBLICATIONS

European Search Report dated Jul. 3, 2002, Munich.

* cited by examiner

*Primary Examiner*—Duc Nguyen
(74) *Attorney, Agent, or Firm*—Reed Smith LLP; Stanley P. Fisher, Esq.; Juan Carlos A. Marquez, Esq.

(57) ABSTRACT

An offset measuring method according to the present invention accurately measures a transmitting time offset of a base station. The offset measuring method for receiving signals from the radio base station and measuring the transmitting time offset of the radio base station includes the steps of calculating estimated values of transmitting time offset based on signals received at a plurality of observation points and selecting a minimum from the estimated offsets to determine the selected minimum value as transmitting time offset of the radio base station.

19 Claims, 12 Drawing Sheets

METHOD AND APPARATUS FOR MEASURING TRANSMITTING TIME OFFSET OF A BASE STATION

BACKGROUND OF THE INVENTION

The present invention relates to a method for measuring the transmitting time offset of a radio base station.

For use in a mobile communication system, a technology is proposed for detecting the location of a mobile device with the use of signals sent from a base station. For example, JP-A-7-181242 discloses a technology for measuring the location of a mobile device in a Code Division Multiple Access (CDMA) system. This technology measures the location of a mobile device by calculating a time difference between PN code transmission times of the base stations using the location of each base station and the propagation time of signals from each base station to the mobile device.

SUMMARY OF THE INVENTION

When measuring the location of a mobile device in a mobile communication system, it is required that the location of the transmission antenna of each base station be identified accurately and that the time (transmitting time or transmission timing) at which a radio wave is issued from the transmission antenna be accurate. However, because the transmission antenna and the RF unit are connected by a high-frequency cable, a delay develops when the signal generated by the RF unit is propagated through the cable. Because this cable length differs according to the base station installation, the delay time caused by the cable also differs among base stations.

In addition, the RF unit has a filter for shaping high-frequency signals, and this filter delays signals when they pass through it. Different filter parts, if used in base stations manufactured at different times, result in different filter delay characteristics among base stations. This difference, in turn, makes the delay time of the filters different among base stations.

Those factors generate a difference (offset) between the time a base station is to send a signal (hereinafter called official timing) and the time the base station actually sends a radio wave from the transmission antenna. When the location of a mobile device is measured based on the arrival delay time of the signal sent from the base station, the transmitting time offset sometimes causes a measurement error.

For example, because the maximum of the recommended transmission time delay of the pilot signal from a base station is 3 $\mu$sec in a TIA/EIA-95 conforming cellular system, a measurement error about 900 m sometimes occur. Although such a transmission time delay does not cause any problem with making a call, this delay causes a serious error when measuring the location of a mobile device based on the signals from the base station. Thus, measuring the location of a mobile device based on the signals from a base station requires the accurate measurement of transmitting time offset.

It is an object of the present invention to provide a method and an apparatus that accurately measure a transmitting time offset generated at a base station and that accurately measure the location of a mobile device.

An offset measuring method according to the present invention receives signals from a radio base station and measures a transmitting time offset of the radio base station. The method comprises the steps of calculating estimated values of transmitting time offset based on signals received at a plurality of observation points; and selecting a minimum from the estimated offsets to produce a measured offset of transmitting time offset of the radio base station.

An offset measuring apparatus according to the present invention receives signals from a radio base station and measures transmitting time offsets of the radio base station. The offset measuring apparatus comprises offset estimating means which comprises a cellular receiver that receives, at a plurality of locations, signals transmitted from the radio base station; a measuring unit for received timing that measures a received timing of a signal transmitted from the radio base station with reference to base clocks; and an offset calculating unit that calculates estimated values of transmitting time offset of the radio base station from the measured received timing; and offset determining means for selecting a minimum of the estimated values of transmitting time offset and for determining the selected minimum as a measured value of transmitting time offset.

The method and the apparatus according to the present invention obtain the estimated values of transmitting time offset from the signals received at multiple locations and select the minimum of the estimated offsets to produce the measured transmitting time offset of the radio base station, increasing the measurement accuracy of the offset. The resulting measured offset, if applied to a location measuring system that finds the location of a mobile device from the radio wave transmitted from a base station, increases the location measurement accuracy of the location measuring system.

Other objects, features and advantages of the present invention will become apparent from the description of the embodiments of the invention taken in conjunction with the accompanying drawings.

DETAILED DESCRIPTION OF THE EMBODIMENTS

Now, some embodiments of the present invention will be described with reference to the drawings.

Figure 1:
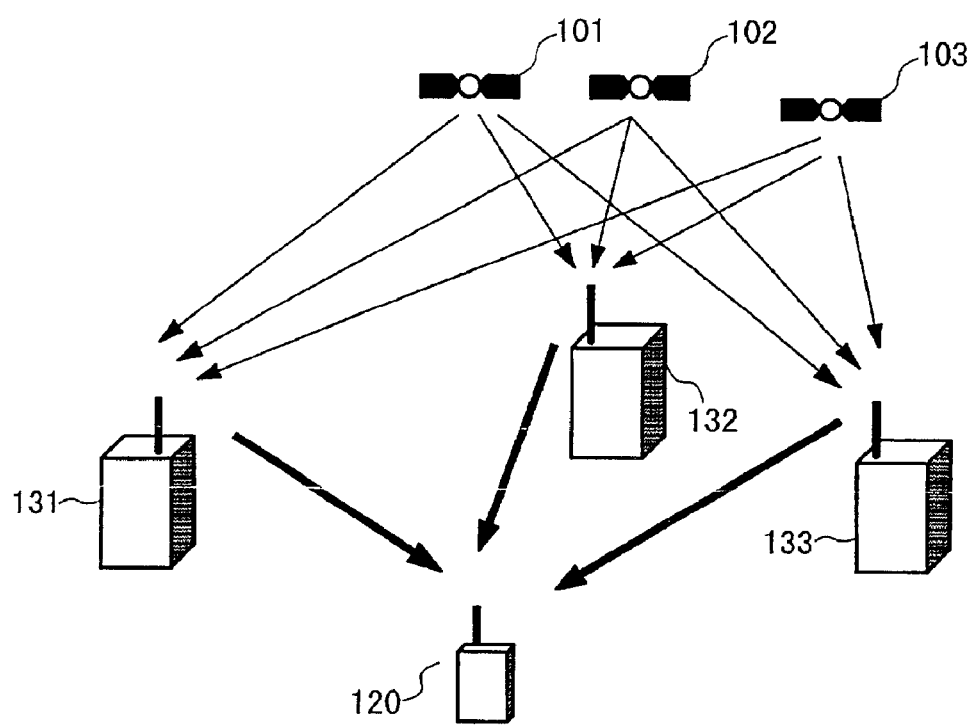
FIG. 1 is a system configuration diagram of a mobile communication system according to the present invention.

FIG. 1 is a system configuration diagram of a mobile communication system according to the present invention that is a CDMA mobile communication system using signals from GPS satellites as base signals.

Some CDMA mobile communication systems determine the transmission times of the base stations in synchronization with time signals from GPS satellites, as shown in FIG. 1.

Referring to FIG. 1, GPS satellites 101, 102, and 103 each have an atomic clock and transmit accurate time signals in a predetermined format based on this atomic clock. In response to this time signal, base stations 131–133 each can find the location and the time of the base station from the delay amounts of time signals sent from a plurality of satellites and the satellite orbit information. This allows each base station to have the same accurate time information as that of GPS satellites and to transmit predetermined signals to mobile devices at the correct time properly synchronized among the base stations. A mobile device 120 may measure its location according to the same principle as that of the base stations described above.

Figure 2:
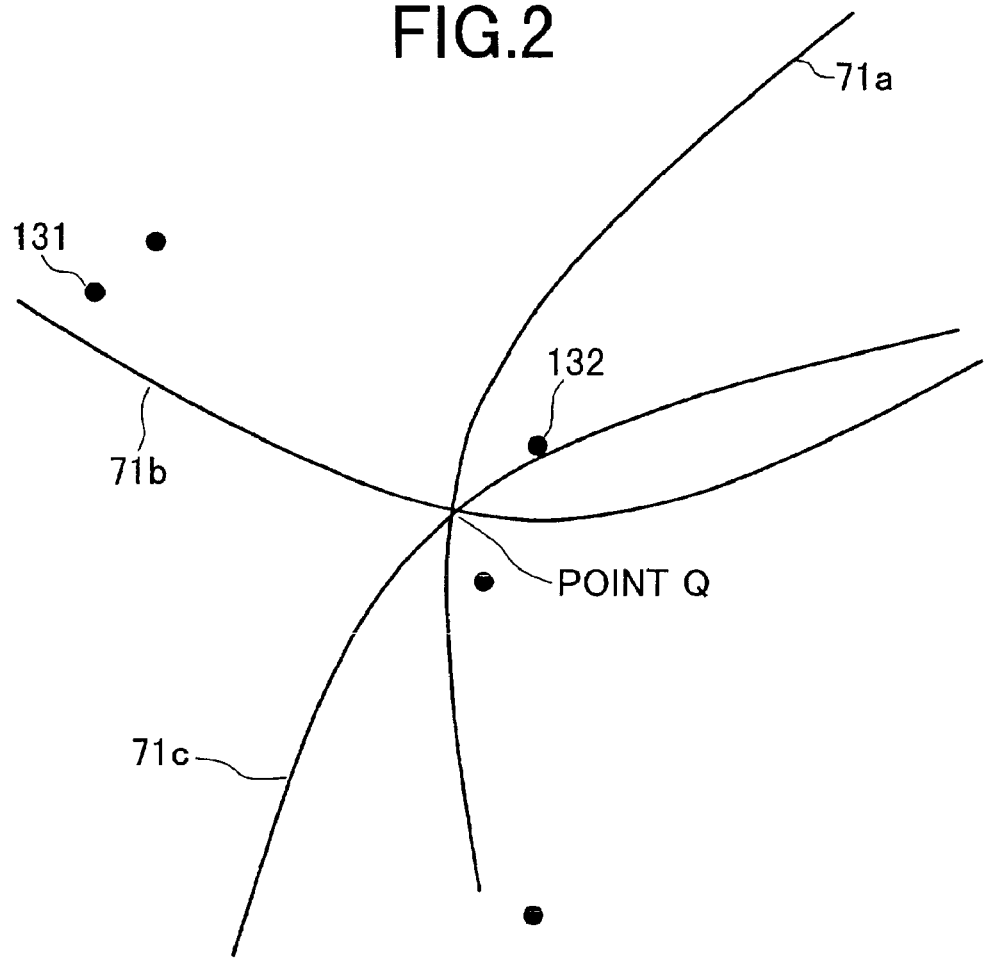
FIG. 2 is a diagram showing the concept of mobile device location measurement according to the present invention.

FIG. 2 is a diagram showing the concept of mobile device location measurement according to the present invention.

In the method according to the present invention, a mobile device measures its location based on the Time Difference of Arrival (TDOA) of the signals from the base stations.

The mobile device 120 located at point Q receives the radio waves from the base station 131 and the base station 132, measures the delay times (Tq1, Tq2) of the signals from the base stations, and calculates the difference (Tq1−Tq2) between the delay times of both base stations. This delay time difference is calculated by dividing the difference (L1−L2) between the distance (L1) from the mobile device 120 to the base station 131 and the distance (L2) from the mobile device 120 to the base station 132 by the propagation speed (light velocity) of the signal.

That is, point Q where the mobile device 120 is located is on a hyperbolic curve 71a that is drawn such that the difference (L1−L2) between the distance from point Q to the base station 131 and the distance from point Q to the base station 132 is constant. This hyperbolic curve 71a is a hyperbolic curve with the positions of the base station 131 and the base station 132 as its focuses.

The mobile device 120 receives signals also from some other base station, finds the delay time difference from the arrival delay times of the signals, and calculates hyperbolic curves 71b and 71c that indicate the point Q. This indicates that point Q, where the mobile device 120 is located, is at the intersection of three hyperbolic curves, 71a, 71b, and 71c.

As compared with the method in which the mobile device location is measured by calculating the distance using the propagation delay time of signals from a base station, the method in which the mobile device location is calculated based on the delay time differences of signals from a plurality of base stations can eliminate time errors common to the propagation delay times (Tq1, Tq2) measured at the mobile device even if such errors are included.

That is, in the method in which the distance is calculated from the propagation delay time of signals from a base station, the error in the distance between the base station and the mobile device increases in proportion to the error in the propagation delay time. On the other hand, in the method in which the mobile device location is measured based on the delay time difference in the signals from two base stations, the delay time difference does not include an error. This is because, even if a common time error ($\delta t$) is included in the propagation delay times (Tq1, Tq2) measured at the mobile device and thus the measured values of the propagation delay times become Tq1+$\delta t$ and Tq2+$\delta t$, the common error $\delta t$ is eliminated during calculation of the difference between the propagation delay times and Tq1−Tq2 is obtained that does not include an error.

An offset in the base station transmission times described above would shift the hyperbolic curves (71a and so on). For example, an offset of 0.33 $\mu$seconds (about 100 m) occurs in the base station 131 and 0.17 $\mu$seconds (about 50 m) occurs in the base station 132, the hyperbolic curve 71a is shifted to the base station 132 side about 50 m. Similarly, the hyperbolic curves 71b and 71c are shifted. A shift in the hyperbolic curves, if any, would increase a measurement error.

Changing the combination of base stations for producing these hyperbolic curves will change the direction and the amount of shift in various ways, potentially increasing the error. Therefore, when measuring the location of a mobile device using signals from base stations, it is important to accurately measure the transmitting time offsets of the base stations.

Figure 3:
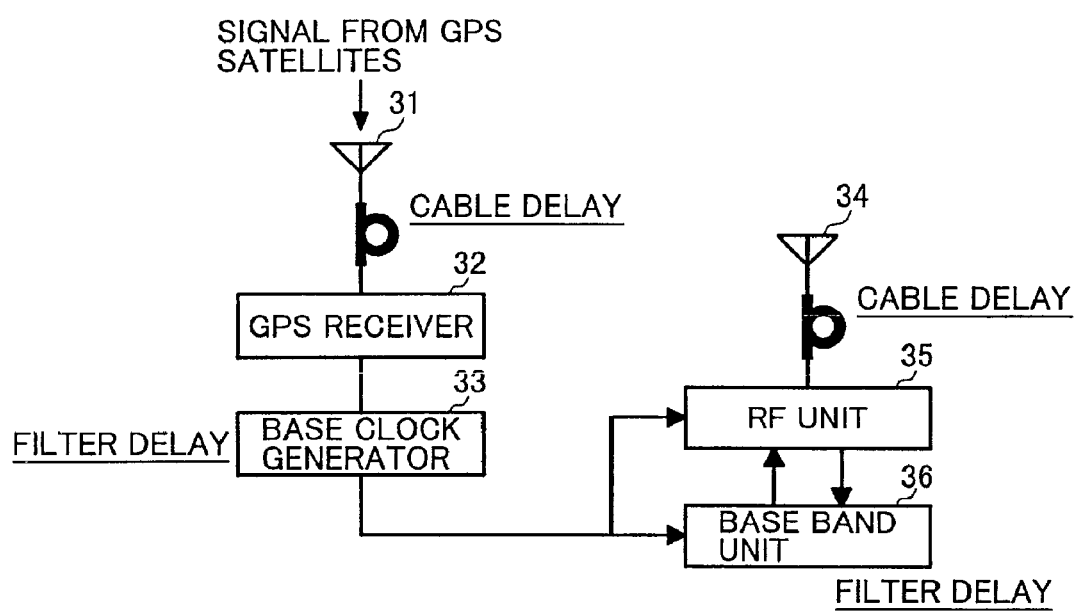
FIG. 3 is a block diagram showing the configuration of a base station according to the present invention.

FIG. 3 is a block diagram showing the general configuration of a base station such as the base station 131.

A base station, such as the base station 131, has a cellular antenna 34 installed on a steel tower or a roof that is open in order to allow radio waves to propagate directly to the mobile device 120. A cable is extended from an RF unit 35 to the cellular antenna 34, and radio waves captured by the cellular antenna 34 are sent to the RF unit 35 through the cable as high-frequency signals.

Also, a GPS antenna 31 receives signals transmitted from a GPS satellite such as the GPS satellite 101, and a GPS receiver 32 estimates the location and the time. A base clock generator 33, which comprises an oscillator that generates clock signals and a frequency adjustment circuit that adjusts the oscillating frequency of the clock signal, calibrates the oscillating frequency of the oscillator, based on the time information estimated using the signals from satellites (GPS satellite 101 and so on), to produce accurate time information to generate base clock signals. The base clock signals generated by the oscillator in the base clock generator 33 are supplied to a base band unit 36 and the RF unit 35. The base band unit 36 generates base band signals based on the base clock signal and supplies them to the RF unit 35, while the RF unit 35 converts the frequency of the base band signal to generate high-frequency signals to be transmitted from the cellular antenna 34.

In this way, the mobile communication system in this embodiment uses time information from satellites, such as the GPS satellite 101, to allow a plurality of separately located base stations 131, 132, and 133 to synchronize the times among their RF units 35 and the base band units 36. The mobile communication system also adjusts the frequency of high-frequency signals generated by the RF units 35 to allow the base stations 131–133 to transmit signals synchronized one another.

Figure 4:
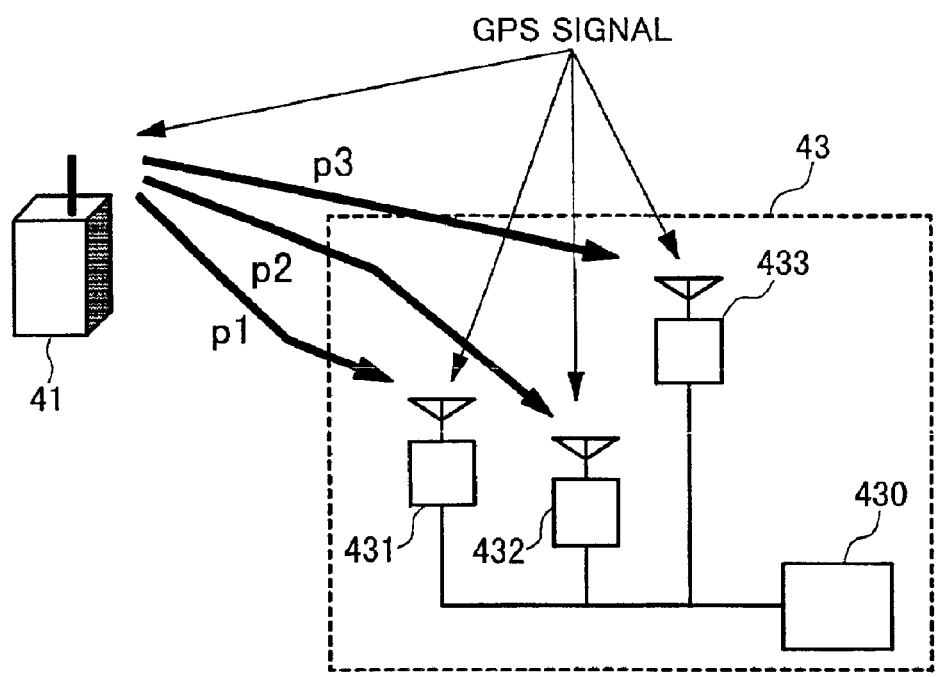
FIG. 4 is a block diagram showing an offset measuring apparatus in a first embodiment of the present invention.

FIG. 4 is a block diagram showing the general configuration of an offset measuring apparatus that measures the transmitting time offset of a base station in the first embodiment of the present invention.

An offset measuring apparatus 43 comprises an offset determination device 430 and offset estimation devices 431, 432, and 433. Although one offset measuring apparatus 43 has three offset estimation devices 431–433 in the first embodiment, the offset measuring apparatus need not always have three offset estimation devices as long as it has two or more. The offset estimation devices 431, 432, and 433 are installed at separate locations (observation points) for receiving signals from a base station 41 at their own observation points. The observation points where offset estimation devices (431 and so on) are installed need only to be separated one another at least ¼ of the wavelength. This means that, when radio waves are received at locations that are separate one another at least ¼ of the wavelength, the delay profiles each indicating received wave delays become different. The offset estimation device (431 and so on) estimates the offset based on signals from the base station 41, which are received at each observation point, and outputs the estimated offset to the offset determination device 430.

The offset determination device 430 uses the offset estimation values estimated by the offset estimation devices (431 and so on) to find the transmitting time offset of the base station 41. More specifically, the offset determination device 430 selects the minimum from the estimated offsets, which are output from the offset estimation devices 431, 432, and 433, to produce the measured offset.

p1, p2, and p3 indicate paths via which the earliest-arrived radio waves, each with an intensity of a predetermined level or higher, are received from the base station 41 to the offset estimation devices 431, 432, and 433. In FIG. 4, the radio waves that are received via p1 and p2 are delayed waves reflected by the buildings located near the path between the base station 41 and the offset estimation device 431 and 432. On the other hand, the radio wave received via p3 is a direct wave that is not reflected by the buildings near the propagation path from the base station 41 to the offset estimation device 433.

The offset estimation devices (431 and so on) are installed at locations that can be viewed from the base station 41. However, for the waves received from the base station 41 via p1, p2, and p3, the earliest-arrived wave is not always a direct wave because the direct wave is weakened by phase-inverted radio waves generated by reflections and so on or because the reflected waves are intensified by the interfere among them. Even when the earliest-arrived wave of the signal from the base station 41 is received at one point and that wave is a delayed wave, the direct wave may be captured because a different delay profile is produced upon reception of the signal from the base station 41 at another location. Therefore, in the first embodiment, a plurality of offset estimation devices (431 and so on) are installed at multiple locations to receive the signal from the base station 41 so that the direct wave may be captured securely.

Figure 5:
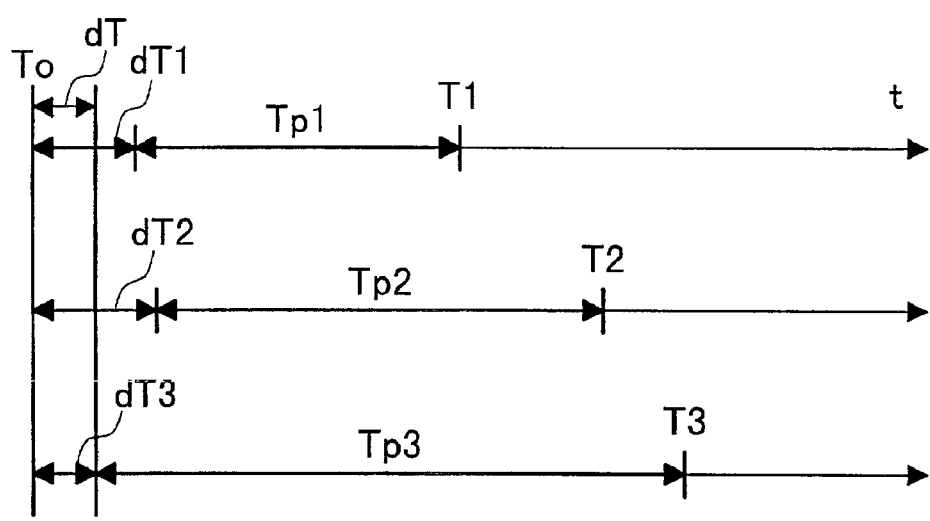
FIG. 5 is a timing chart showing the principle under which an offset is measured in the first embodiment of the present invention.

FIG. 5 is a timing chart showing the offset measurement principle used in the embodiment of the present invention.

In FIG. 5, the horizontal axis indicates the time. The figure shows a wave transmitted from the base station 41 is delayed when the offset estimation devices (431 and so on) receive the wave. The three time axes indicate the times at which the offset estimation devices 431, 432, and 433, from top to bottom, receive the signal, respectively.

In FIG. 5, To is the nominal transmitting time of a signal from the base station 41. dT is the transmitting time offset of the base station 41. This is the value to be obtained by the present invention. T1, T2, and T3 indicate the received times at which the offset estimation devices 431, 432, and 433 receive the signal from the base station 41. Tp1, Tp2, and Tp3 are propagation times required by the direct wave to propagate between the base station 41 and the offset estimation devices 431, 432, and 433. Those times are propagation delay times based on the distances between the base station 41 and the offset estimation devices (431 and so on). That is, those propagation delay times are calculated by dividing the distances from the base station 41 to the offset estimation devices 431, 432, and 433 by the propagation speed of the wave (light velocity).

dT1, dT2, and dT3 are the estimated values of transmitting time offset of the base station calculated by the offset estimation devices 431, 432, and 433. The estimated value of transmitting time offset of the base station is calculated by subtracting the propagation time of the direct wave, which is calculated based on the distance between the base station 41 and the offset estimation device (431 and so on), from the difference between the received timing of the signal from the base station 41 and the nominal transmitting time of the base station 41. This relation is shown as expression 1.

Estimated value of transmitting time offset=Received timing−(Nominal transmitting time of base station+Propagation time of direct wave)          Expression 1:

The offset estimation devices 431, 432, and 433 each measure the received timing of the signal from the base station 41 and find the estimated value of transmitting time offset of the base station 41 from expression 1.

For example, the estimated value of transmitting time offset (dT1) of the offset estimation device 431 is calculated by subtracting the nominal transmitting time of base station (To) and the propagation time of direct wave (Tp1) from the received timing (T1) of the signal from the base station as shown by expression 2.

$dT1 = T1 − (To + Tp1)$          Expression 2:

On the other hand, the estimated value of transmitting time offset (dT3) of the offset estimation device 433 is calculated by subtracting the nominal transmitting time of base station (To) and the propagation time of direct wave (Tp3) from the received timing (T3) of the signal from the base station as shown by expression 3.

$dT3 = T3 − (To + Tp3)$          Expression 3:

Comparison of the estimated values of transmitting time offset of the base station 41 (dT1, dT2, dT3), obtained by the offset estimation devices 431, 432, and 433, indicates that dT3 is smallest and that dT1 or dT2 is larger than dT3. The radio wave from the base station 41, which is delayed by reflections caused by the buildings around the propagation path, is never received before the direct wave. Therefore, the smallest of the estimated offsets output by the offset estimation devices (431 and so on) is the value that is least affected by the delay caused by the propagation path and that is closest to the transmitting time offset of base station. Thus, the offset determination device 430 selects the minimum from the transmitting time offsets of the base station, estimated by the offset estimation devices (431 and so on), to produce the measurement result of the transmitting time offset of the base station 41.

The transmitting time offsets of the base station 41 obtained by the offset estimation devices 431 and 432 (dT1, dT2) are larger than the transmitting time offset of the base station 41 obtained by the offset estimation devices 433 (dT3). Therefore, it is estimated that dT1 and dT2 are larger than the actual transmitting time offset of base station, indicating that the signals received by the offset estimation devices 431 and 432 are delayed waves that are reflected and/or diffracted.

The smallest (dT3) of the estimated values of transmitting time offsets of the base station 41 (dT1, dT2, dT3), obtained by the offset estimation devices 431 and so on, is estimated to be the value closest to the actual transmitting time offset of the base station. FIG. 5 shows that dT3 matches the actual transmitting time offset of base station, indicating that the earliest-arrived wave received by the offset estimation device 433 is a direct wave.

Selecting the smallest (dT3) from the estimated values of transmitting time offset through the offset determination device 430 as described above allows the transmitting time offset of the base station 41 to be measured accurately.

It is also possible to find an estimated offset by allowing one offset estimation device (for example, 431) to receive the signal from the base station 41 multiple times in order to estimate the transmitting time offset multiple times and then by averaging of the estimated offsets to give the estimated offset of the offset estimation device 431. In addition, it is also possible to find a measured offset by repeatedly obtaining a measured offset from the minimum of the estimated offsets obtained by the offset estimation device (431 and so on) and then by averaging the measured offsets to give the measured offset value at this particular observation point. In general, provided that each measurement is made independently, averaging N observation values (estimated offsets, measured offsets) may reduce the error to the reciprocal of the square root of error N found during one-time measurement (see expression 4).

Figure 6:
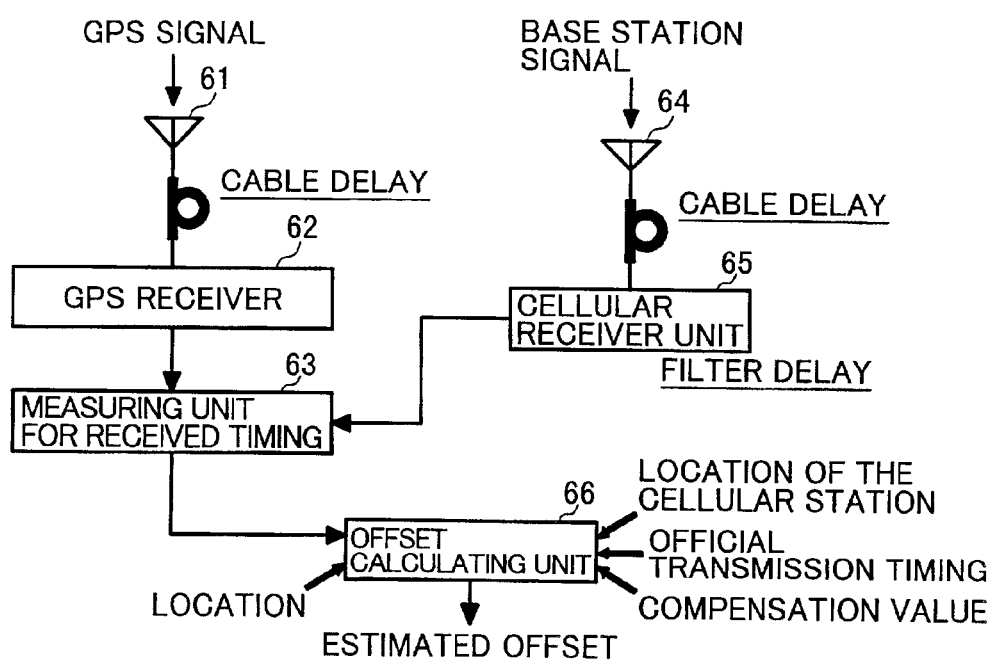
FIG. 6 is a block diagram of an offset estimation device in the first embodiment of the present invention.

FIG. 6 is a block diagram showing the general configuration of the offset estimation device (431 and so on) provided in the offset measuring apparatus 43 in the first embodiment of the present invention.

In the embodiment shown in FIG. 6, a GPS antenna 61 is connected to a GPS receiver 62. The GPS receiver 62 uses signals from a GPS satellite received via the GPS antenna 61 to calculate the location of, and the time information (current time of day) on, the offset estimation device. A cellular antenna 64 is connected to a cellular receiver 65. The cellular receiver 65 receives signals from the base station and sends them to a measuring unit for received timing 63. The measuring unit for received timing 63 uses the accurate time information calibrated by the signals from the GPS satellite to measure the received timing of the signals from the base station.

To measure the received timing of a signal from the base station, the measuring unit for received timing 63 is run, for example, on the accurate clock signal generated based on the time signal from the GPS receiver 62, and the sliding correlator is used to generate the received timing from the phase with a high correlation with the pilot signal transmitted by the base station. That is, the pilot signal transmitted by the base station over the pilot channel is de-spread with a predetermined spreading code and then power-integrated to produce the delay profile. From this delay profile, the received timing of the signal that has an intensity of a predetermined level or higher and that arrives first is extracted to measure the received timing of the signal from the base station.

An offset calculating unit 66 uses a compensation value, given by the delay amount of the cables of the offset estimation device and the delay amount of the filter, to calculate an accurate received timing by compensating for the measured received timing. Then, the offset calculating unit 66 subtracts the nominal transmitting time of base station and the propagation time of the direct wave transmitted from the base station to the offset estimation device (value generated by dividing the distance between the base station and the offset estimation device by the propagation speed (light velocity) of the radio wave) from the accurate received timing that has been compensate for and outputs the resulting value to the offset determination device 430 as the estimated value of transmitting time offset.

Compensation by the offset calculating unit 66 described above is required because delays are caused as high-frequency signals propagate through the cables. This is because, in the offset estimation device, the GPS antenna 61 and the GPS receiver 62, and the cellular antenna 64 and the cellular receiver 65, are connected with the cables. In addition, the GPS receiver 62 and cellular receiver 65 each comprise a filter for shaping the waveform of the received high-frequency signal, and those filters generate delays as the signal pass through them. Therefore, there is a need for compensating for the time at which the signal was received.

In addition, the base station location used by the offset calculating unit 66 may be associated with the identification number of the base station and stored in the offset measuring apparatus in advance or may be extracted from the broadcast signal transmitted from the base station and received by the cellular receiver 65. The location of the offset estimation device, if installed in a fixed position, may be stored in advance in the offset measuring, or the location information may be obtained by measuring the location of the offset measuring apparatus with the GPS receiver 62.

The official transmission timing, which is predetermined for each base station and at which the signal is transmitted from the base station, is defined by the start of a PN code, because each base station uses a PN code unique in the same PN sequence. This official transmission timing may be associated with the identification number of the base station and stored in the offset measuring apparatus in advance. The official transmission timing may also be defined as the time at which the start of the PN code is extracted from the broadcast signal transmitted from the base station and received by the cellular receiver 65.

The measuring unit for received timing 63, offset calculating unit 66, and offset determination device 430 each comprise a processor and a memory. The memory contains a program that executes the functions described above. The processor reads the program from the memory for execution. That is, the measuring unit for received timing 63 executes a program that includes a procedure for measuring the received timing of signals transmitted from a radio base station with reference to the base clock. The offset calculating unit 66 executes a program that includes a procedure for calculating the estimated value of transmitting time offset from the signals received at a plurality of observation points. The offset determination device 430 executes a program that includes a procedure for selecting the minimum from the estimated offsets to produce the measured value of transmitting time offset of the radio base station. This configuration allows the offset measuring apparatus 43 to function as received timing measuring means (measuring unit for received timing 63) for measuring the received timing of signals transmitted from a radio base station with reference to the base clock, as offset calculating means (offset calculating unit 66) for calculating the estimated value of transmitting time offset of the radio base station from the measured received timing, and as offset determining means (offset determination device 430) for selecting the minimum from the estimated offsets to produce the measured value of transmitting time offset.

The measuring unit for received timing 63, the offset calculating unit 66, and the offset determination device 430 each may have separate processors and separate memories, or they may have a common processor and a common memory.

Figure 7:
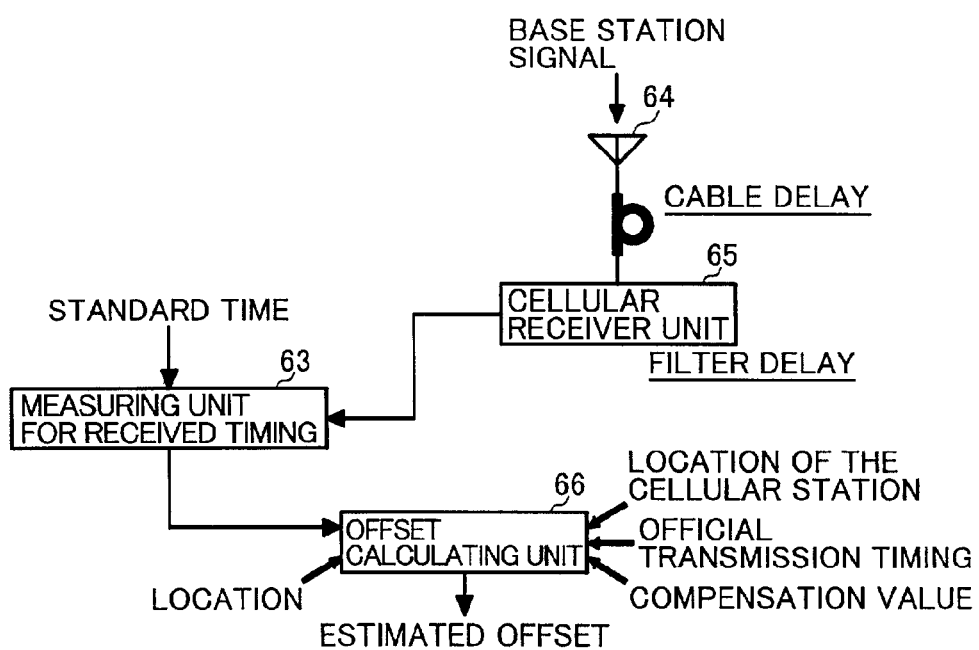
FIG. 7 is a block diagram showing another configuration of offset estimation device in the first embodiment of the present invention.

FIG. 7 is a block diagram showing another configuration of an offset estimation device provided in the offset measuring apparatus in the first embodiment of the present invention.

The offset estimation device in the embodiment shown in FIG. 7 references the time of one clock as the reference time. That is, the offset estimation device in this embodiment takes advantage of the fact that, when measuring the location of a mobile device based on the Time Difference of Arrival (TDOA) of the signals from a base station, the offset measuring apparatus does not require absolute transmitting time offset of the base stations but only requires the transmitting time offset relative to the reference time of a particular clock.

An element with the same reference numeral as that of the corresponding element of the offset estimation device in FIG. 6 performs the same operation and, therefore, its detailed description is omitted.

In the embodiment shown in FIG. 7, the measuring unit for received timing 63 measures the received timing based on the high-precision reference time. The clock that is referenced by the measuring unit for received timing 63 as the reference time may be a clock with the accuracy of a clock used in a base station. For example, a cesium atomic clock or a pilot signal transmitted from a base station other than the base station whose offset is to be measured may be used. To measure the received timing of a signal from the base station, the measuring unit for received timing 63 is run, for example, on the accurate clock signal generated by the oscillator in the offset measuring apparatus, and the sliding correlator is used to generate a received timing from a phase with a high correlation with the pilot signal transmitted by the base station.

An offset calculating unit 66 uses a compensation value, given by the delay amount of the cables of the offset estimation device and the delay amount of the filter, to calculate the correct received timing by compensating for the measured received timing. Then, the offset calculating unit 66 subtracts the nominal transmitting time of base station and the propagation time of the direct wave transmitted from the base station to the offset estimation device (value generated by dividing the distance between the base station and the offset estimation device by the propagation speed (light velocity) of the radio wave) from the accurate received timing that has been compensated for and outputs the resulting value to the offset determination device 430 as the estimated value of transmitting time offset.

The distance between the base station and the offset estimation device is calculated by the base station location and the offset estimation device location. The base station location may be associated with the identification number of the base station and stored in the offset measuring apparatus in advance or may be extracted from the broadcast signal transmitted from the base station and received by the cellular receiver 65. As the offset estimation device location, location information stored in advance in the offset measuring apparatus is used. The official transmission timing may be associated with the identification number of the base station and stored in the offset measuring apparatus in advance or may be extracted from the broadcast signal transmitted from the base station and received by the cellular receiver 65.

Note that the offset estimation device in the embodiment shown in FIG. 6 uses signals from a GPS satellite as the reference time that is used in the offset estimation device in the embodiment shown in FIG. 7.

As described above, the offset measuring apparatus 43 comprises the plurality of offset estimation devices (431 and so on) and the offset determination device 430. Each of the plurality of offset estimation devices, which work as offset estimating means, comprises the receiver (cellular antenna 64, cellular receiver 65 connected to cellular antenna 64) that receives signals from the base station 41 at multiple locations, the measuring unit for received timing 63 that extracts the received timing of signals from the base station 41 with reference to the base clock signal that is used as the basis of offset measurement, and the offset calculating unit 66 that calculates the estimated value of transmitting time offset of the base station 41 from the measured received timing. On the other hand, the offset determination device 430, which works as offset determining means, determines the minimum of the estimated values of transmitting time offset, calculated by the offset estimation devices 431–433, as the measured value of transmitting time offset. Therefore, the offset measuring apparatus 43 finds the estimated values of transmitting time offset from the signals from the base station 41, which are received by the plurality of offset estimation devices (431 and so on) installed at a plurality of locations, and selects the minimum from the estimated offsets to produce the measured value of transmitting time offset of the base station 41, thus increasing offset measurement accuracy. In addition, the measurement result of the offset, if used for a measurement system that calculates the position of a mobile device using the radio wave from the base station, would increase the location measurement accuracy of the measurement system.

In addition, observation points where the plurality of offset estimation devices (431 and so on) are installed (points where cellular antennas 64 are installed) are separated one another at least ¼ of the wavelength of the received waves to be measured and, therefore, each of the offset estimation devices (431 and so on) can have its own delay profile. This makes it possible to capture the direct wave securely and to measure the transmitting time offset of the base station 41 accurately.

One offset estimation device (for example, 431) may receive signals from the base station 41 multiple times, produce the estimated value of transmitting time offset multiple times, and then average the multiple estimated offsets to give the result as the estimated offset of the offset estimation device 431. This estimation method reduces measurement errors.

Because the clock signal which will be used as the basis of offset measurement is generated from signals transmitted from a GPS satellite and received by the GPS receiver 62, the offset estimation device can measure the transmitting time offset of the base station 41 using accurate time information and thus measure the offset accurately.

In addition, the offset estimation device in the embodiment shown in FIG. 7 generates the clock signal, which will be used as the basis of offset measurement, from an atomic clock or from a pilot signal transmitted from a base station other than the base station whose offset is to be measured. This configuration allows the offset estimation device to accurately measure the transmitting time offset of the base station 41 without using the GPS receiver 62 (GPS antenna 61).

Figure 8:
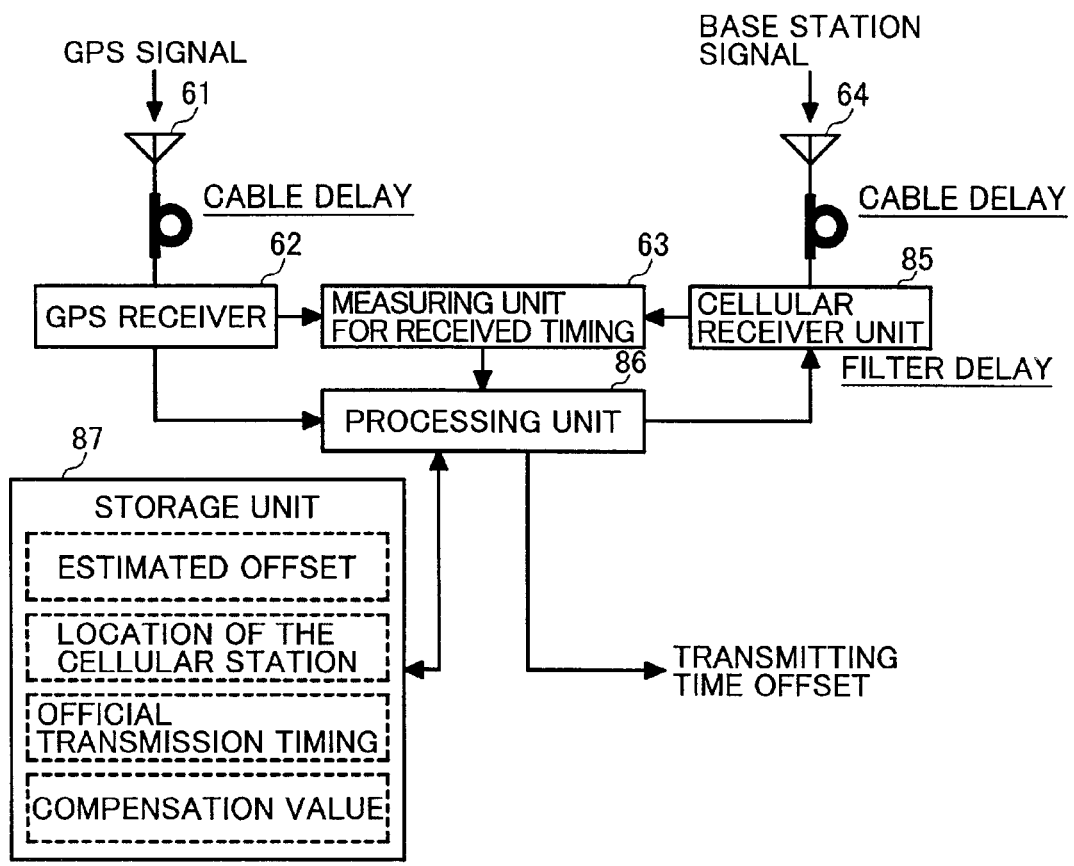
FIG. 8 is a block diagram of an offset measuring apparatus in a second embodiment of the present invention.

FIG. 8 is a block diagram showing the general configuration of an offset measuring apparatus in a second embodiment of the present invention.

The offset measuring apparatus in the second embodiment differs from the offset measuring apparatus in the first embodiment described above (FIG. 4, FIG. 6, and FIG. 7) in that one cellular antenna 64 and one cellular receiver unit 85 are provided. The offset measuring apparatus in the second embodiment, which is mounted on a vehicle such as a car when measuring the transmitting time offset of a base station, travels around multiple locations and measures radio waves from the base station to get and store the estimated values of transmitting time offset of the base station at those observation points. After traveling around the multiple observation points for measurement, the device selects the minimum from those stored estimated offsets to produce the measured value of transmitting time offset of the base station.

Next, the operation of the elements of the offset measuring apparatus in the second embodiment will be described with reference to FIG. 8. An element with the same reference numeral as that of the corresponding element in the first embodiment (FIG. 6) performs the same operation and, therefore, its detailed description is omitted.

In the second embodiment, a GPS antenna 61 is connected to a GPS receiver 62. The GPS receiver 62 uses the GPS signal received via the GPS antenna 61 to calculate the location of, and the time information (current time of day) on, the offset measuring apparatus 43. A cellular antenna 64 is connected to a cellular receiver unit 85. The cellular receiver unit 85 receives signals from the base station under control of a processing unit 86 and sends them to a measuring unit for received timing 63. The measuring unit for received timing 63 uses the accurate time information calibrated by signals from the GPS satellite to measure the received timing of the signal from the base station. To measure the received timing of the signal from the base station, the measuring unit for received timing 63 is run, for example, on the accurate clock signal generated based on the time signal from the GPS receiver 62, and the sliding correlator is used to generate a received timing from the phase with a high correlation with the pilot signal transmitted by the base station.

The processing unit 86 uses a compensation value, given by the delay amount of the cables connected to the antennas 61 and 64 of the offset measuring apparatus and the delay amount of the filter, to calculate an accurate received timing by compensating for the measured received timing. Then, the processing unit 86 subtracts the nominal transmitting time of base station and the propagation time of the direct wave transmitted from the base station to the offset estimation device (value generated by dividing the distance between the base station and the offset estimation device by the propagation speed (light velocity) of the radio wave) from the accurate received timing that has been compensated for and temporarily stores the resulting value in a storage unit 87 as the estimated value of transmitting time offset. In addition, the processing unit 86 selects the minimum from the multiple estimated offsets stored in the storage unit 87 and outputs it as the measured value of transmitting time offset of the base station.

The location of the offset estimation device used by the processing unit 86 is obtained by measuring the location of the offset measuring apparatus with the use of the GPS receiver 62 to get location information. The official transmission timing and the base station location may be associated with the identification number of the base station and stored in the storage unit 87 in advance or may be extracted from the broadcast signal transmitted from the base station and received by the cellular receiver unit 85.

It is also possible to allow one observation point to receive the signal from the base station 41 multiple times to estimate the estimated value of transmitting time offset multiple times and to store the averaged result of the estimated offsets in the storage unit 87 as the estimated offset. Averaging N observation values (estimated offsets) may reduce the error to the reciprocal of the square root of error N found during one-time measurement (see expression 4).

As described above, the offset measuring apparatus in the second embodiment comprises the receiver (cellular antenna 64, and cellular receiver unit 85 connected to the cellular antenna 64) that receives signals from the base station 41, the measuring unit for received timing 63 that extracts the received timing of signals from the base station 41 with reference to the base clock signal, which is the basis of offset measurement, and outputs estimated offsets, the storage unit 87 in which the estimated offsets are stored, and the processing unit 86 that controls the storage of the estimated offsets into the storage unit 87. The processing unit 86, which selects the minimum from the estimated values of transmitting time offset calculated by the offset estimation device to produce the transmitting time offset, functions as offset determining means. Therefore, the offset measuring apparatus, which travels around to measure the received timing of signals from the base station 41 in multiple locations, can accurately measure the transmitting time offset of base station without using multiple GPS receivers 62 (GPS antennas 61), multiple cellular receiver units 85 (cellular antennas 64), and multiple measuring units for received timing 63.

In addition, the storage unit 87 is provided to store estimated offsets from which the minimum is to be selected. This configuration eliminates the need to select the minimum of estimated offsets while measuring the received timings of signals from the base station, thereby reducing the processing load of the processing unit 86.

Because the clock signal which will be used as the basis of offset measurement is generated from signals transmitted from a GPS satellite and received by the GPS receiver 62, the offset measuring apparatus can measure the transmitting time offset of the base station 41 using accurate time information and thus measure the offset accurately.

In addition, because the offset measuring apparatus receives signals from the base station 41 at one location multiple times, estimates the estimated value of transmitting time offset multiple times, and stores the average of the estimated offsets in the storage unit 87 as the estimated offset, the errors involved in measurement are reduced.

Figure 9:
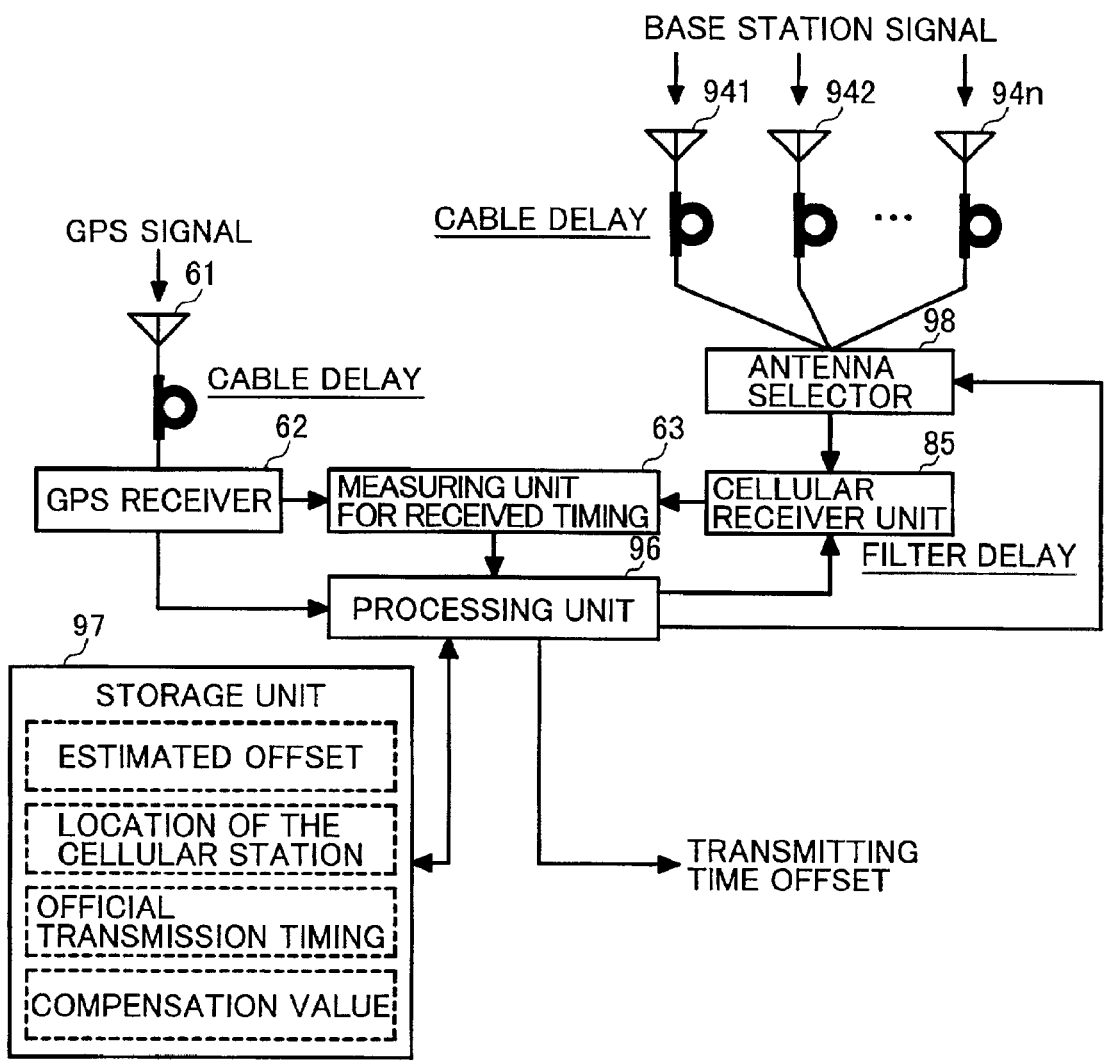
FIG. 9 is a block diagram of an offset measuring apparatus in a third embodiment of the present invention.

FIG. 9 is a block diagram showing the general configuration of an offset measuring apparatus in a third embodiment of the present invention.

The offset measuring apparatus in the third embodiment differs from the offset measuring apparatus in the first embodiment described above (FIG. 4, FIG. 6, FIG. 7) in that one cellular receiver unit 85 is provided for a plurality of cellular antennas 941, . . . , 94n.

In the third embodiment, a GPS antenna 61 is connected to a GPS receiver 62. The GPS receiver 62 calculates the location of, and time information (current time of day) on, the offset measuring apparatus from GPS signals received by the antenna 61. The cellular antennas 941, . . . , 94n, extended from an antenna selector 98, are installed at separate locations (observation points) and are connected to the cellular receiver unit 85 via the antenna selector 98.

The antenna selector 98 selects one of cellular antennas 941, . . . , 94n connected to the cellular receiver unit 85 under instructions from a processing unit 96. The cellular receiver unit 85 receives signals transmitted from the base station and sends them to a measuring unit for received timing 63 under control of the processing unit 96. The measuring unit for received timing 63 uses accurate time information calibrated by signals from a GPS satellite to measure the received timing of signals from the base station. To measure the received timing of signals from the base station, the measuring unit for received timing 63 is run, for example, on the accurate clock signal generated based on the time signal from the GPS receiver 62, and the sliding correlator is used to generate a received timing from the phase with a high correlation with the pilot signal transmitted by the base station.

The processing unit 96 uses a compensation value, given by the delay amount of the antenna 61 and the cables connected to the antennas 941, ..., 94n and the delay amount of the filter of the offset measuring apparatus, to calculate an accurate received timing by compensating for the received timing measured by the measuring unit for received timing 63. Then, the processing unit 96 subtracts the nominal transmitting time of base station and the propagation time of the direct wave transmitted from the base station to the offset estimation device (value generated by dividing the distance between the base station and the offset estimation device by the propagation speed (light velocity) of the radio wave) from the accurate received timing that has been compensated for and temporarily stores the resulting value in a storage unit 97 as the estimated value of transmitting time offset. The compensation value described above is the compensation value given by the delay amount of the cables connected to the selected one of the cellular antennas 941, ..., 94n. The location of each cellular antenna 941, ..., 94n is calculated by the processing unit 96 based on the location of the GPS antenna 61 measured by the GPS receiver 62, with the location relative to the GPS antenna 61 measured in advance. When the cellular antennas 941 and so on are near the GPS antenna 61, the location of the GPS antenna 61 may be used as the location of the cellular antennas 941 and so on.

The processing unit 96 selects the minimum from the estimated values of transmitting time offset that are calculated using the cellular antennas 941, ..., 94n and that are stored in a storage unit 97 and then outputs the selected value as the measured value of transmitting time offset of the base station.

The location of the offset measuring apparatus used by the processing unit 96 is obtained by measuring the location of the offset measuring apparatus with the use of the GPS receiver 62 to get location information. The official transmission timing and the base station location may be associated with the identification number of the base station and stored in the storage unit 97 in advance or may be extracted from the broadcast signal transmitted from the base station and received by the cellular receiver unit 85.

Next, the conditions for installing the plurality of cellular antennas 941, ..., 94n of the offset measuring apparatus will be described. The cellular antennas 941, ..., 94n should be installed at a location that can be viewed from the base station whose offset is to be measured, with at least ¼ of the wavelength of the received signal apart one another. For example, when measuring the transmitting time offset of a base station in the band of 800 MHz, it is required that the cellular antennas 941, ..., 94n be separated one another about at least 94 mm.

It is also possible to measure the measured value of transmitting time offset multiple times at one observation point and, by averaging the measured offsets, to give the resulting value as the estimated offset at the observation point. In general, if an error s is generated during one-time measurement and if each measurement is made independently, then averaging N observation values (estimated offsets, measured offsets) may reduce the error to the reciprocal of the square root of N. That is, if the averaged error of N observation values is s', then the error (s') is represented by expression 4.

$$s' = s/\sqrt{N} \qquad \text{Expression 4}$$

When averaging measured values as described above, it is also possible to provide a threshold to check to see if the signal received from the base station is good. If the signal is found bad as a result of comparison with the threshold, the observation value (estimated offset) based on the signal may be excluded from the estimated values to be used for averaging. For example, before making the average calculation, it is possible to exclude an observation value of a signal whose signal-to-noise ratio (S/N) is not sufficiently high. More specifically, in the case of a TIA/EIA-95-conforming base station, an estimated offset generated from a signal with lower than 15 dB of S/N should be excluded from averaging processing. The S/N ratio may be obtained from the cellular receiver unit 85.

As described above, the offset measuring apparatus in the third embodiment comprises the receiver (multiple cellular antennas 941, ..., 94n, antenna selector 98 that switches the cellular antennas 941, ..., 94n for connection to cellular receiver unit 85, and cellular receiver unit 85 connected to cellular antennas 941, ..., 94n) that receives signals from the base station 41, the measuring unit for received timing 63 that extracts the received timing of a signal from the base station 41 with reference to the base clock signal that is used as the basis of offset measurement and outputs the estimated offset, the storage unit 97 in which estimated offsets are stored, and the processing unit 96 that controls the storage of the estimated offsets into the storage unit 97. The processing unit 96, which selects the minimum from the estimated values of transmitting time offset calculated by the offset estimation device to produce the offset of transmission timing, functions as offset determining means. This configuration allows the transmitting time offset of the base station 41 to be measured accurately without using the multiple GPS receivers 62 (GPS antenna 61), multiple cellular receiver units 85, and multiple measuring units for received timing 63 and without increasing the number of observation points around which the offset measuring apparatus must travel.

The storage unit 97 is provided to store estimated offsets from which the minimum is to be selected. This configuration eliminates the need to select the minimum of estimated offsets while measuring the received timing of the signal from the base station 41, thereby reducing the processing load of the processing unit 96.

Because the clock signal which will be used as the basis of offset measurement is generated from signals transmitted from a GPS satellite and received by the GPS receiver 62, the offset measuring apparatus can measure the transmitting time offset of the base station 41 using accurate time information and thus measure the offset accurately.

In addition, because the offset measuring apparatus receives signals from the base station 41 multiple times through the cellular antennas 941, 94n, estimates the estimated offset of transmitting time at the antenna multiple times, and stores the averaged result of the estimated offsets in the storage unit 97 as the estimated offset, the errors involved in measurement are reduced.

In addition, the cellular antennas 941, 94n are separated one anther at least ¼ of the wavelength of the received waves to be measured and, therefore, each of the cellular antennas 941, ..., 94n can have its own delay profile. This configuration makes it possible to capture the direct wave securely and to measure the transmitting time offset of the base station 41 accurately.

Figure 10:
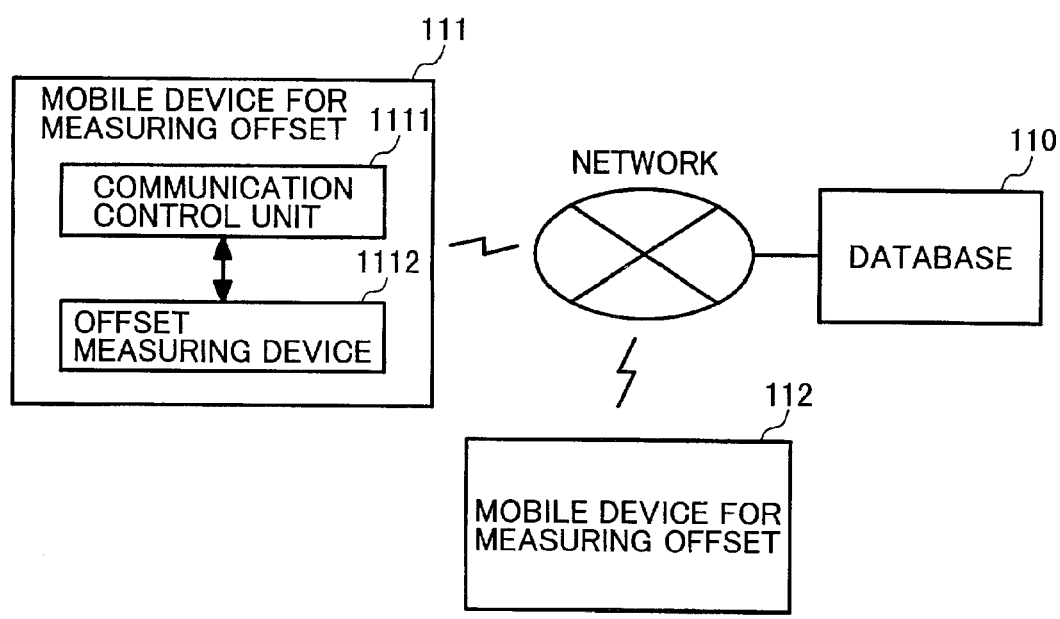
FIG. 10 is a diagram showing the configuration of an offset measuring system according to the present invention.

FIG. 10 is a diagram showing the configuration of an offset measuring system according to the present invention.

The offset measuring system shown in FIG. 10 efficiently collects and stores the transmitting time offset of a base station using the offset measuring apparatus (offset measuring apparatus) used in the embodiments (FIG. 4–FIG. 9) described above and the network.

In a mobile communication system where base stations are usually installed in a wide range, multiple offset measuring apparatus, if used for measuring the transmitting time offsets of all base stations, could reduce the measurement time. In such a system, the measured values of transmitting time offset of the base stations should be collected efficiently for storage in a database. To do so, the offset measuring system shown in FIG. 10 connects multiple offset measuring terminals (offset measuring apparatus) over the network to store the measured offsets of the mobile devices in the database.

Mobile devices for measuring offset 111 and 112, each comprising a communication control unit 1111 and an offset measuring apparatus 1112, are portable (or vehicle-mounted) terminals. The communication control unit 1111 connects the mobile device for measuring offset 111 to a database 110 over the network to transmit the transmitting time offset of a base station (not shown), which was measured by the offset measuring apparatus 1112, to the database 110 over the network. The offset measuring apparatus 1112, with the configuration shown in FIGS. 4 and 9, measures the transmitting time offset of the base station.

Figure 11:
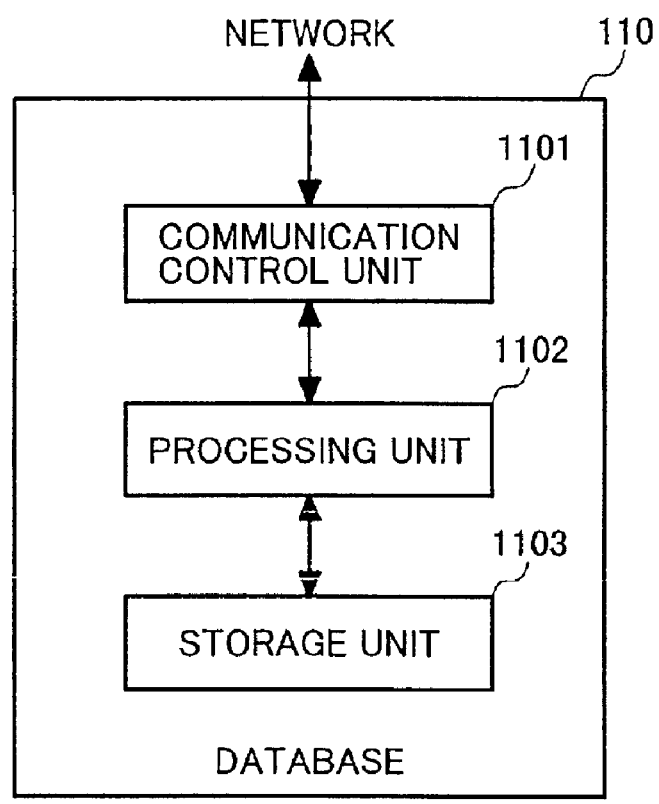
FIG. 11 is a block diagram of a database according to the present invention.

FIG. 11 is a block diagram showing the general configuration of the database 110 shown in FIG. 10.

The database 110 comprises a communication control unit 1101 that receives over the network an offset measured by the offset measuring apparatus, a storage unit 1103 in which the measured values of transmitting time offset of the base stations are stored, and a processing unit 1102 that updates a stored offset to a measured offset that is received.

Next, the operation of the offset measuring system will be described.

First, the mobile device for measuring offset 111 is carried to a measurement location. The measurement location is a location from which the base station whose offset is to be measured is viewed so that the direct wave can reach. The mobile device for measuring offset 111 is fixed at the measurement location for measuring the transmitting time offset of the base station. The measured offset is transmitted to the database 110 over the network with the identification information (for example, base station ID number) attached to identify the base station. Because the offset is measured at a location where the radio wave from the base station reaches, that is, within the area of the base station whose offset is to be measured, the offset measuring apparatus can use the network via a radio communication line established between the offset measuring apparatus and the base station.

After the offset of one base station is measured, the mobile device for measuring offset is carried to some other location for measuring the offset of the next base station. In the new location, the measurement of an offset and the transmission of the measured offset to the database are repeated. Other mobile devices for measuring offset also repeat the measurement of an offset and the transmission of the measured offset to the database in the same way. The system may be designed such that two or more mobile devices for measuring offset will not measure the offset of the same base station.

Alternatively, the system may be designed such that two or more mobile devices for measuring offset will measure the offset of the same base station. When two or more mobile devices for measuring offset measure the offset of the same base station, the database 110 may have the function of the offset determination device 430. That is, the database 110 selects the minimum from the estimated offsets, which are stored in the database and which are associated with the same base station and transmitted from two or more mobile devices for measuring offset 111, and stores the selected offset in the database 110 as the measured offset.

In addition, the system may be designed such that an estimated offset transferred from the mobile device for measuring offset 111 is transferred to another mobile device for measuring offset 112. After that, the mobile device for measuring offset 112 selects the minimum of the estimated offsets as the measured offset, transfers the selected value to the 110, and stores it therein.

The database 110 accumulates and stores the offsets, received from the mobile device for measuring offset 111 for each base station, based on the identification information on the base stations. In this way, the transmitting time offsets of the base stations are measured, collected, and stored one after another in the database.

It is possible that one person or organization measures offsets and another collects data and builds a database. More specifically, a common carrier collects the offsets of the base stations measured by others and builds a database.

Although the radio communication line including the base station is used, another network may be used to collect measured offset data. More specifically, the offsets may be transferred over another radio network (for example, DMCA) or a wired network (for example, dedicated line) for building a database.

The system may be designed such that, when the offset of a base station is received for which another offset is already stored, the stored offset is updated to the new offset if the latter is smaller.

Figure 12:
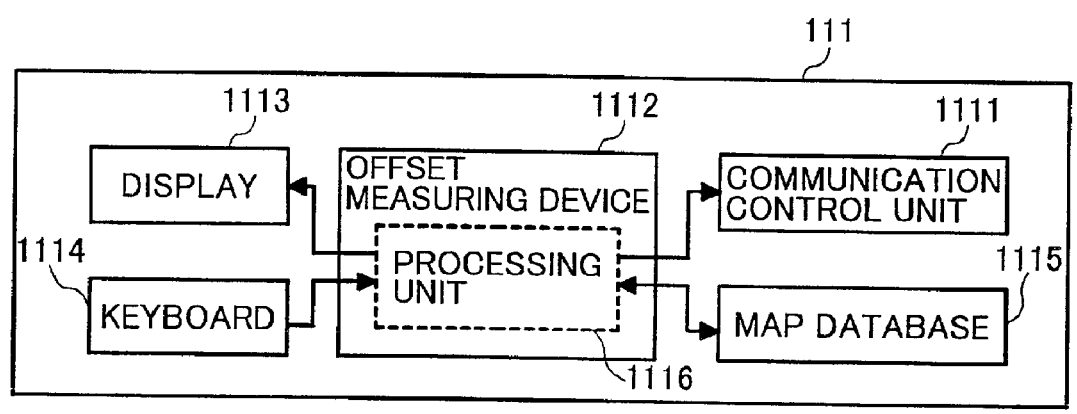
FIG. 12 is a block diagram of a mobile device for measuring offset according to the present invention.

FIG. 12 is a block diagram showing another configuration of the mobile device for measuring offset shown in FIG. 10.

Unlike the mobile device for measuring offset shown in FIG. 10, the mobile device for measuring offset shown in FIG. 12 has a map database 1115 for displaying map information on a display 1113. An element with the same reference numeral as that of the corresponding element of the mobile device for measuring offset in FIG. 10 performs the same operation and, therefore, its detailed description is omitted.

The mobile device for measuring offset 111 comprises the communication control unit 1111, offset measuring apparatus 1112, display 1113, keyboard 1114, and map database 1115.

The communication control unit 1111 connects the mobile device for measuring offset 111 to the database 110 over the network to transmit transmitting time offsets to the database 110 (see FIG. 10). The offset measuring apparatus 1112 measures the transmitting time offset of a base station. The display 1113 displays thereon the operation status of the offset measuring apparatus, the transmitting time offset of a base station (estimated offset, measured offset), and the locations of base stations and offset measuring apparatus that use the map database 1115. The keyboard 1114 is used to give an instruction to the offset measuring apparatus. The map database 1115 contains map data on the area where the base stations whose offsets are to be measured are located and displays map information on the display 1113.

The offset measuring apparatus 1112 has a processing unit 1116 that controls not only the components of the offset measuring apparatus 1112 but also the communication control unit 1111, display 1113, keyboard 1114, and map database 1115.

As described above, the offset measuring system in this embodiment collects over the network the measured offsets output from the offset measuring apparatus and stores them in the database 110, efficiently collecting and storing the transmitting time offsets of base stations.

In addition, the offset measuring apparatus in this embodiment displays map data, stored in the map database 1115, on the display 1113. This ability is convenient when measuring the transmitting time offset of a base station because information on the location of the device, the location of the base station whose offset is to be measured, and surrounding buildings is obtained.

Typical aspects of the present invention other than those claimed in the claim are as follows:

An offset storage device which receives signals from a radio base station and which measures, and stores therein, transmitting time offsets of said radio base station, said offset storage device comprising offset estimating means which comprises a receiving unit that receives, at a plurality of locations, signals transmitted from said radio base station; a received timing measuring unit that measures a received timing of a signal transmitted from said radio base station with reference to base clocks; and an offset calculating unit that calculates estimated values of transmitting time offset of said radio base station from the measured received timing; a storage unit in which the estimated offsets are stored; and a processing unit that controls storage of said estimated offsets into said storage unit to select a minimum of the estimated offsets.

The offset storage device in which the transmitting time offsets of said radio base station are stored, wherein said processing unit selects the minimum of the estimated offsets stored in said storage unit to produce a measured transmitting time offset of said radio base station.

The offset storage device, further comprising a GPS receiver for generating the base clocks from signals received by said GPS receiver and transmitted from GPS satellites.

The offset storage device wherein said offset estimating means calculates an average of the estimated values of transmitting time offset, measured multiple times, to produce the estimated offset.

An offset measuring method for receiving signals from a radio base station and for measuring a transmitting time offset of the radio base station, said method comprising the steps of outputting estimated values of transmitting time offset calculated based on signals received at a plurality of observation points; collecting, over a network, the estimated offsets that were output; and selecting a minimum of the collected estimated offsets to produce a measured value of transmitting time offset.

An offset measuring system which receives signals from a radio base station and which measures transmitting time offsets of said radio base station, said offset measuring system comprising offset estimating means which comprises a receiving unit that receives, at a plurality of locations, signals transmitted from said radio base station; a received timing measuring unit that measures a received timing of a signal transmitted from said radio base station with reference to base clocks; and an offset calculating unit that calculates estimated values of transmitting time offset of said radio base station from the measured received timing; output means for outputting the estimated offsets, and a database in which the estimated offsets collected over a network are stored.

A database building method for building a database in which transmitting time offsets of a radio base station, calculated by receiving signals from the radio base station, are stored, said method comprising the steps of collecting, over a network, estimated values of transmitting time offset calculated based on signals received at a plurality of observation points; and storing the estimated offsets in the database to select a minimum from the estimated offsets that have been collected.

A database building method for building a database in which transmitting time offsets of a radio base station, calculated by receiving signals from the radio base station, are stored, said method comprising the steps of calculating estimated values of transmitting time offset calculated based on signals received at a plurality of observation points; selecting a minimum from the estimated offsets to produce a measured transmitting time offset of the radio base station; collecting the measured offsets over a network; and storing measured the collected measured offsets in the database.

A database in which transmitting time offsets of a radio base station, calculated by receiving signals from the radio base station, are stored, wherein estimated offsets estimated by offset estimating means are collected over a network, said offset estimating means comprising a receiving unit that receives, at a plurality of locations, signals transmitted from said radio base station; a received timing measuring unit that measures a received timing of a signal transmitted from said radio base station with reference to base clocks; and an offset calculating unit that calculates estimated values of transmitting time offset of said radio base station from the measured received timing and wherein the estimated offsets are stored to allow a minimum of the estimated offsets to be selected.

A database in which transmitting time offsets of a radio base station, calculated by receiving signals from the radio base station, are stored, wherein a measured offset determined by offset determining means is collected over a network and the collected measured offset is stored in the database, said offset determining means determines a smallest of estimated offsets as the measured value of transmitting time offset, said estimated offsets being calculated by offset calculating means that calculates the estimated values of transmitting time offset based on signals received at a plurality of observation points.

A program that causes a computer to execute an offset measuring method that receives signals from a radio base station and measures transmitting time offsets of the radio base station, wherein said program causes the computer to execute a procedure for calculating estimated values of transmitting time offset from signals received at a plurality of observation points and a procedure for selecting a minimum of the estimated offsets as a measured offset of transmitting time offset of the radio base station.

A program that causes a computer to function as an offset measuring apparatus that receives signals from a radio base station and measures transmitting time offsets of the radio base station, wherein said program causes the computer to function as received timing measuring means for measuring received timings of the signals transmitted from the radio base station with reference to base clocks, as offset calculating means for calculating estimated values of transmitting time offset of the radio base station from the received timings that have been measured, and as offset determining means for selecting a minimum of the estimated offsets and determining the selected minimum as a measured value of transmitting time offset.

It will be further understood by those skilled in the art that the foregoing description has been made on embodiments of the invention and that various changes and modifications may be made in the invention without departing from the spirit of the invention and scope of the appended claims.

What is claimed is:

1. An offset measuring method for receiving signals from a radio base station and measuring a transmitting time offset of the radio base station, comprising the steps of:

calculating estimated values of the transmitting time offset based on signals received at a plurality of observation points with known positions or known distances from the radio base station; and selecting a minimum from the estimated offset values to determine the minimum value as a measured value of the transmitting time offset of the radio base station, wherein the transmitting time offset is a time difference between an official timing for sending out a signal and an actual timing when the signal is actually transmitted out from an antenna of the radio base station.

2. The offset measuring method according to claim 1, wherein the estimated offsets are each calculated from a time at which a particular signal is transmitted from the radio base station, a time at which the particular signal transmitted from the radio base station is received, and a distance between the radio base station and a receiving antenna.

3. An offset measuring method for receiving signals from a radio base station and measuring a transmitting time offset of the radio base station, comprising the steps of:

calculating estimated values of the transmitting time offset based on signals received at a plurality of observation points; and electing a minimum from the estimated offset values to determine the minimum value as a measured value of the transmitting time offset of the radio base station, wherein an average of the estimated offsets measured at each of the observation locations multiple times is the estimated offset of the location.

4. The offset measuring method according to claim 1, wherein, if the received signal is not good, the signal is excluded from offset measuring.

5. The offset measuring method according to claim 1, wherein timing information used as a base of the offset measurement is generated from GPS satellites.

6. The offset measuring method according to claim 1, wherein timing information used as a base of the offset measurement is generated from a base station other that the base station whose offset is to be measured.

7. An offset measuring apparatus which receives signals from a radio base station and which measures transmitting time offset of the radio base station, said offset measuring apparatus comprising:

offset estimating means which comprises a cellular receiver that receives, at a plurality of locations with known positions or known distances from the radio base station, signals transmitted from the radio base station;

a measuring unit for received timing that measures a received timing of a signal transmitted from said radio base station with reference to base clocks;

an offset calculating unit that calculates estimated values of the transmitting time offset of said radio base station from the measured received timing; and offset determining means for selecting a minimum of the estimated values of the transmitting time offset and for determining the selected minimum as a measured value of the transmitting time offset, wherein the transmitting time offset is a time difference between an official timing for sending out the signal and an actual timing when the signal is actually transmitted out from an antenna of the radio base station.

8. A offset measuring apparatus which receives signals from a radio base station and which measures a transmitting time offset of the radio base station, said offset measuring apparatus comprising:

offset estimating means which comprises a cellular receiver that receives, at a plurality of locations, signals transmitted from the radio base station;

a measuring unit for received timing that measures a received timing of a signal transmitted from said radio base station with reference to base clocks;

an offset calculating unit that calculates estimated values of the transmitting time offset of said radio base station from the measured received timing; and offset determining means for selecting a minimum of the estimated values of the transmitting time offset and for determining the selected minimum as a measured value of the transmitting time offset, wherein said offset measuring apparatus has a plurality of offset estimating means to receive the signals from the base station at a plurality of locations.

9. The offset measuring apparatus according to claim 8, wherein said offset estimating means calculates an average of the estimated values of transmitting time offset, which are measured multiple times, as the estimated offset of said offset estimating means.

10. The offset measuring apparatus according to claim 7, wherein said offset measuring means has a plurality of antennas to receive the signals from the radio base station at a plurality of locations.

11. The offset measuring apparatus according to claim 10, wherein said plurality of antennas are separated one another at a specified distance apart, further comprising an antenna selector that switches the antennas for connection to said receiving unit.

12. The offset measuring apparatus according to claim 10, wherein said antennas are separated one another at least ¼ of a wavelength of the received signal.

13. A offset measuring apparatus which receives signals from a radio base station and which measures a transmitting time offset of the radio base station, said offset measuring apparatus comprising:

offset estimating means which comprises a cellular receiver that receives, at a plurality of locations, signals transmitted from the radio base station;

a measuring unit for received timing that measures a received timing of a signal transmitted from said radio base station with reference to base clocks;

an offset calculating unit that calculates estimated values of the transmitting time offset of said radio base station from the measured received timing; and offset determining means for select a minimum of the estimated values of the transmitting time offset and for determining the selected minimum as a measured value of the transmitting time offset, wherein said offset measuring means has a plurality of antennas to receive the signals to receive signals from the radio base station at a plurality of locations, and wherein said offset estimating means uses each of said antennas to calculate an average of the estimated values of transmitting time offset, which are measured multiple times, as the estimated offset of the antenna.

14. The offset measuring apparatus according to claim 7, wherein said offset measuring device, which is movable, moves around multiple observation points to receive the signals from the base station and measures the received timings of the signals transmitted from the base station.

15. The offset measuring apparatus according to claim 7, further comprising a GPS receiver that generates the base clocks from signals received from a GPS satellite by said GPS receiver.

16. The offset measuring method according to claim 1, wherein an average of the estimated offsets measured at each of the observation locations multiple times is the estimated offset of the location.

17. The offset measuring apparatus according to claim 7, wherein said offset measuring apparatus has a plurality of offset estimating means to receive the signals from the base station at a plurality of locations.

18. The offset measuring apparatus according to claim 8, wherein said offset estimating means calculates an average of the estimated values of transmitting time offset, which are measured multiple times, as the estimated offset of said offset estimating means.

19. The offset measuring apparatus according to claim 10, wherein said offset estimating means uses each of said antennas to calculate an average of the estimated values of transmitting time offset, which are measured multiple times, as the estimated offset of the antenna.

* * * * *